(12) United States Patent
Berry et al.

(10) Patent No.: US 8,016,237 B2
(45) Date of Patent: Sep. 13, 2011

(54) METHODS AND APPARATUS FOR AN INTEGRATED AERODYNAMIC PANEL

(75) Inventors: Eldon R. Berry, Enumclaw, WA (US);
John E. Mundel, Newcastle, WA (US);
Vladislay Andryukov, Kent, WA (US)

(73) Assignee: The Boeing Company, Chicago, IL (US)

( * ) Notice: Subject to any disclaimer, the term of this patent is extended or adjusted under 35 U.S.C. 154(b) by 1072 days.

(21) Appl. No.: 11/954,974

(22) Filed: Dec. 12, 2007

(65) Prior Publication Data
US 2009/0294589 A1    Dec. 3, 2009

(51) Int. Cl.
*B64C 1/12* (2006.01)
(52) U.S. Cl. ........................................ 244/131; 244/132
(58) Field of Classification Search .............. 244/117 R, 244/119, 123.1, 123.13, 131, 133, 130, 132
See application file for complete search history.

(56) References Cited

U.S. PATENT DOCUMENTS

| | | | | |
|---|---|---|---|---|
| 3,259,345 A | * | 7/1966 | Martignoni et al. | 244/129.3 |
| 3,429,023 A | * | 2/1969 | Blythe et al. | 244/123.13 |
| 3,465,420 A | * | 9/1969 | Webb et al. | 428/621 |
| 3,578,526 A | * | 5/1971 | Harding | 244/123.13 |
| 4,667,906 A | * | 5/1987 | Suarez et al. | 244/124 |
| 5,941,479 A | * | 8/1999 | Sunne et al. | 244/121 |
| 6,328,258 B1 | * | 12/2001 | Porte | 244/53 B |
| 6,655,633 B1 | * | 12/2003 | Chapman, Jr. | 244/123.9 |
| 2007/0193146 A1 | * | 8/2007 | Carstensen et al. | 52/268 |
| 2008/0067288 A1 | * | 3/2008 | Eberth et al. | 244/129.3 |

* cited by examiner

*Primary Examiner* — Galen Barefoot
(74) *Attorney, Agent, or Firm* — Yee & Associates, P.C.; Charles S. Gumpel

(57) ABSTRACT

An integrated aerodynamic panel—e.g., for a trailing edge or leading edge of an aircraft aerodynamic surface—includes a first panel region defining inner and outer mold lines, and a second panel region contiguous with and extending from the first panel region in a tapering fashion. A splice plate region extends from the second panel region and includes an edge band region configured to accept a fastener. A filler region (e.g., a SYNCORE or fiberglass structure) adjacent the second panel region has an exposed surface substantially flush with the outer mold line.

20 Claims, 3 Drawing Sheets

METHODS AND APPARATUS FOR AN INTEGRATED AERODYNAMIC PANEL

TECHNICAL FIELD

The embodiments described herein generally relate to control panels used in connection with aircraft and the like, and more particularly relate to methods and apparatus for an integrated aerodynamic panel.

BACKGROUND

Aircraft generally include a number of aerodynamic panels distributed over various structures—e.g., along the trailing edge (TE) and leading edge (LE) of the wings, the horizontal stabilizer, and/or the vertical stabilizer of an aircraft. Such assemblies typically include a secondary panel that is secured (permanent or removable) to a main box skin panel.

More particularly, with reference to the cross-sectional diagram shown in FIG. 1, a traditional panel assembly 100 generally includes a secondary panel 101 coupled to a relatively thick skin panel (or "main box" skin panel) 102. Panel 101 has an inner mold line (IML) 126 and outer mold line (OML) 124, and generally includes a core 120 bounded by thin skin plies 122. Panel 101 tapers to a relatively thin edgeband 118 and is bonded connected to a splice plate or "attach plate" 112 via a number of fasteners 110. A filler (e.g., a phenolic filler) 114 and shim 116 may be provided between splice plate 112 and edge band 118 such that OML 124 is substantially flush with surface 106 of skin panel 102. Splice plate 112 is coupled to skin panel 102 via another set of fasteners 108 in an edge band skin overhang region (or simply "edge band region") 104.

As can be seen in FIG. 1, the resulting panel assembly 100 includes multiple components and connections. For example, the resulting system includes two rows of fasteners (108 and 110). The large number of fasteners and other components tends to increase cost, weight, and assembly time.

Accordingly, it is desirable to provide a simplified, light, and more cost-effective flight panel system. Furthermore, other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for an integrated aerodynamic panel that includes a reduced set of components and can be attached in a simplified manner. In one embodiment, an integrated aerodynamic panel—e.g., for a trailing edge or leading edge of an aircraft surface—includes a first panel region having a first surface defining a outer mold line and a second surface, opposite the first surface, defining an inner mold line; a second panel region contiguous with and extending from the first panel region, the second panel region having a thickness that decreases as it extends from the first panel region; a splice plate region extending from the second panel region, the edge band region configured to accept a fastener; and a filler region adjacent the second panel region and having an exposed surface substantially flush with the outer mold line.

In accordance with another embodiment, an aerodynamic panel system includes a skin panel having an edge band defined thereon and an integrated aerodynamic panel. The integrated aerodynamic panel includes a first panel region having a first surface defining a outer mold line and a second surface, opposite the first surface, defining an inner mold line. A second panel region is contiguous with and extends from the first panel region, and the second panel region has a thickness that decreases as it extends from the first panel region. A splice plate region extends from the second panel region. A filler region adjacent the second panel region has an exposed surface substantially flush with the outer mold line. A plurality of fasteners is configured to rigidly attach the splice plate region of the integrated aerodynamic panel to the edge band region.

In accordance with another embodiment, a method for forming an aerodynamic panel assembly includes the steps of providing an aircraft skin panel having an edge band defined thereon, forming a first panel region contiguous with a second panel region, wherein the first panel region has a first surface defining a outer mold line, and the second panel region is contiguous with and extends from the first panel region such that it has a gradually decreasing thickness; forming a splice plate region extending from the second panel region; forming a filler region and bonding it to the second panel region such that the filler region has an exposed surface substantially flush with the outer mold line; and fastening the splice plate region of the integrated aerodynamic panel to the edge band of the skin panel via a plurality of fasteners.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
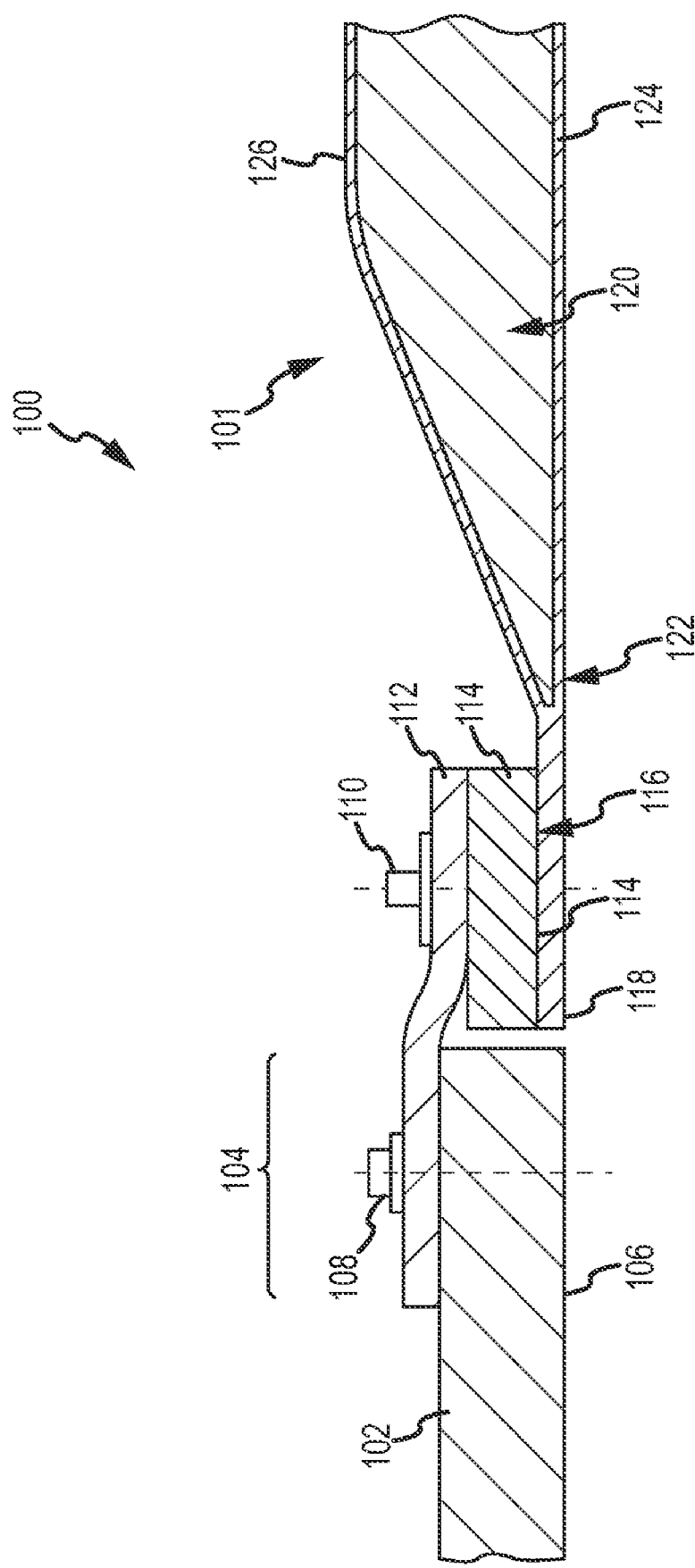
FIG. 1 is a cross-sectional overview of prior art control panel.

In general, what is described is an aerodynamic panel that has an integrated filler region that maintains a continuous aerodynamic surface (or a continuity of the surface 106-124) and an edge band that may be directly affixed to a skin panel or the like. In this way, an entire row of fasteners is removed, and the overall weight, cost, and complexity of the assembly is reduced.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments described herein are, for example, capable of use in sequences other than those illustrated or otherwise described herein. Unless expressly stated otherwise, "connected" means that one element/node/feature is directly joined to (or directly communicates with) another element/node/feature, but not necessarily mechanically. Likewise, unless expressly stated otherwise, "coupled" means that one element/node/feature is directly or indirectly joined to (or directly or indirectly communicates with) another element/node/feature, but not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

In the interest of conciseness, conventional techniques, structures, and principles known by those skilled in the art may not be described herein, including, for example, conventional spacecraft structural design, basic principles of thermal protection systems and materials, data acquisition systems, and basic sensor technologies.

Figure 2:
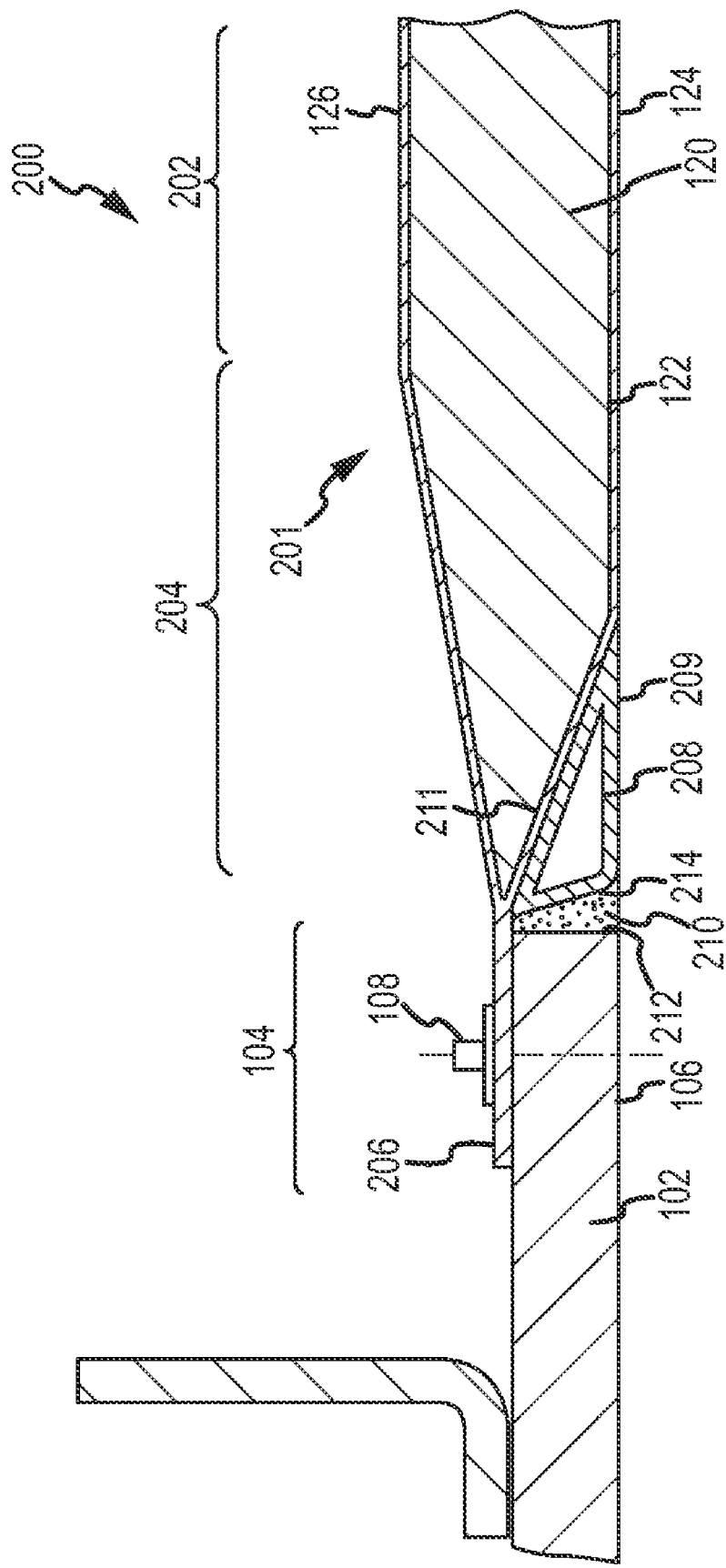
FIG. 2 is a cross-sectional overview of an integrated control panel in accordance with one embodiment.

Referring now to FIG. 2, a panel system 200 for an aircraft, spacecraft, or other such vehicle generally includes a relatively thick skin panel (or "main box skin panel") 102 having a skin overhang 104 defined thereon which is coupled to an integrated aerodynamic panel 201 with a relatively thin edgeband. Aerodynamic panel 201 includes three main regions: a first panel region 202 having a surface defining a outer mold line (OML) 126, and a second surface, opposite the first surface, defining an inner mold line (IML) 124. The OML and IML may or may not be parallel to each other, depending upon the application.

Figure 3:
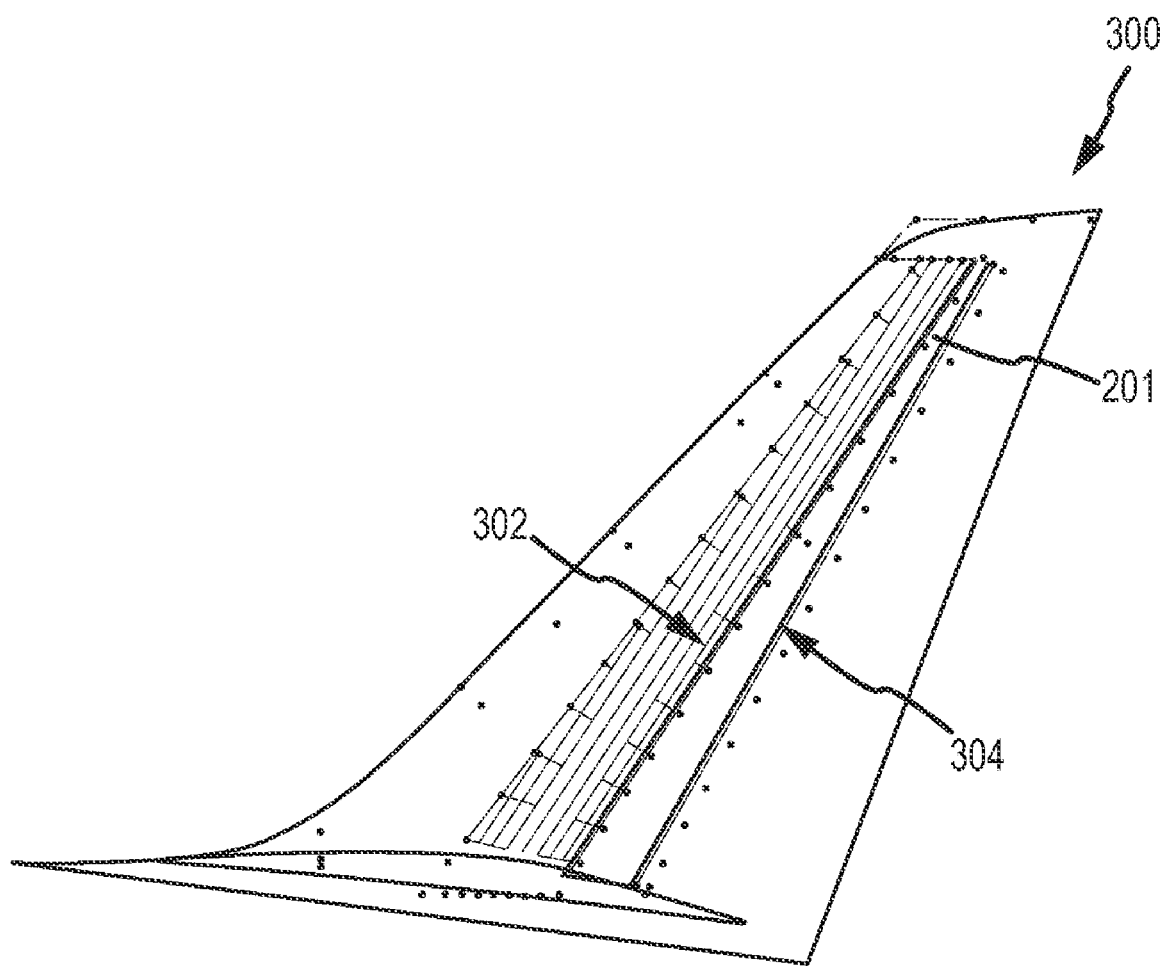
FIG. 3 is an isometric overview of an aircraft vertical stabilizer of the type in which the present embodiments may be used.

The integrated aerodynamic panel 201 may be positioned, for example, at a leading edge or a trailing edge of a wing on the aircraft, on a horizontal or vertical fin stabilizer of an aircraft an access panel. As shown in FIG. 3, integrated panel 201 may be fixed to a skin splice interface 302 in a trailing edge panel area 304 of a wing 300.

Referring again to FIG. 2, a second panel region 204 is contiguous with and extends from the first panel region 202. As shown, second panel region 204 generally tapers or has a thickness that decreases as it extends from the first panel region 202. The profile defined by this tapering second region 204 may vary—i.e., it might be substantially triangular as shown, or may have any arbitrary curvilinear or linear shape.

Core 120 may comprise a lightweight nomex honeycomb fiberglass or other suitable material, and may have an inner structure (such as a honeycomb structure). In general, core 120 is bounded by OML 126 and skin plies 122 (corresponding to IML 124). Various plies, such as fiberglass, a composite material, or one or more of Loctite-Aerospace's syntactic SYNCORE materials, may be layered to produce thicker components, as is known in the art.

A splice plate region 206 extends from the second panel region 204, and is configured to accept a suitable fastener that extends through edgeband region 104. Splice plate region 206 may comprise, for example, one or more of the materials suggested above in connection with skin plies 122. Note that splice plate region 206 may or may not be flush with either OML 126 or IML 124.

A plurality of fasteners 108 (e.g., rivets, flush mounted bolts, or any other suitable fastener) are configured to rigidly attach the splice plate region 206 of the integrated aerodynamic panel to skin panel 102. These fasteners 108 may be permanent or removeable, depending upon the application. In the illustrated embodiment, region 204 tapers such that splice plate region 206 is located between the planes defined by IML 126 and 124. In various embodiments, splice plate region 206 may be flush with IML 126 or OML 124.

A filler region 208 is secured adjacent the second panel region 204 and has an exposed surface 209 that is substantially flush with the outer mold line 124 and surface 106 of skin 102. Filler region 208 is preferably bonded to (or fabricated the same time as) the lower angled surface 211 of region 204, and may comprise any suitable material—e.g., fiberglass, polymer honeycomb core, a material such as Syntactic core (SYNCORE)—and may include structural inserts (such as fiberglass ribs) for added structural support. Filler region 208 is preferably less rigid and lighter weight than the 122 skin plies. Thus, second and first panel regions 204 and 202 are integrated with splice plate 206 and filler region 208 to form a single contiguous unit. Filler region 208 may be enclosed by additional fiber glass fabric or other suitable materials, such as that material that composes skin plies 122 and 126 along the surfaces 208 and 214, to limit its exposure to environmental damage and prevent debonding.

In one embodiment, the filler region 208 has an exposed surface 214 generally facing and non-parallel to a surface (e.g., an edge) 212 of skin panel 102. This volume may be filled with a suitable material 210, such as a polymer or other resilient sealant compound. In a particular embodiment, there is approximately a maximum of 0.1 inches between surfaces 212 and 214.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An integrated aerodynamic panel comprising:
   a first panel region having a first surface defining an outer mold line and a second surface, opposite the first surface, defining an inner mold line;
   a second panel region contiguous with and extending from the first panel region, the second panel region having a thickness that decreases as it extends from the first panel region;
   a splice plate region extending from the second panel region and configured to accept a fastener; and
   a filler region adjacent the second panel region and having an exposed surface substantially flush with the inner mold line.

2. The integrated aerodynamic panel of claim 1, wherein the second panel region tapers such that the splice plate region is not flush with the outer mold line.

3. The integrated aerodynamic panel of claim 1, wherein the filler region comprises one of fiberglass and a syntactic material.

4. The integrated aerodynamic panel of claim 3, wherein the filler region includes structural inserts.

5. The integrated aerodynamic panel of claim 1, wherein the splice plate region is configured to be attached to a main box panel associated with a trailing edge or a leading edge of an aerodynamic surface on an aircraft.

6. The integrated aerodynamic panel of claim 1, wherein the first panel region comprises a core material bounded by skin plies, and wherein the filler region is bonded to the skin plies.

7. The integrated aerodynamic panel of claim 1 further comprising:
    a sealant disposed adjacent the filler region and opposite the inner mold line.

8. An aerodynamic panel system for an aircraft, the system comprising:
    a skin panel having an edge band region defined thereon;
    an integrated aerodynamic panel comprising:
        a first panel region having a first surface defining a outer mold line and a second surface, opposite the first surface, defining an inner mold line;
        a second panel region contiguous with and extending from the first panel region, the second panel region having a thickness that decreases as it extends from the first panel region;
        a splice plate region extending from the second panel region; and
        a filler region adjacent the second panel region and having an exposed surface substantially flush with the inner mold line; and
    a plurality of fasteners configured to rigidly attach the splice plate region of the integrated aerodynamic panel to the edge band region.

9. The aerodynamic panel system of claim 8, wherein the integrated aerodynamic panel is positioned at a leading edge or a trailing edge of an aerodynamic surface on the aircraft.

10. The aerodynamic panel system of claim 8, wherein the second panel region tapers such that the splice plate region is not flush with the outer mold line.

11. The aerodynamic panel system of claim 8, wherein the filler region comprises one of fiberglass and a syntactic material.

12. The aerodynamic panel system of claim 11, wherein the filler region comprises fiberglass rib inserts.

13. The aerodynamic panel system of claim 8, wherein the first panel region comprises a core material bounded by skin plies, and wherein the filler region is bonded to the skin plies.

14. The aerodynamic panel system of claim 8, wherein the plurality of fasteners comprise removable bolts.

15. The aerodynamic panel system of claim 8, wherein the filler region has an exposed surface generally facing by non-parallel to a surface of the skin panel.

16. The aerodynamic panel system of claim 8 further comprising:
    a sealant disposed between the filler region and the skin panel.

17. A method for forming an aerodynamic panel assembly, comprising the steps of:
    providing an aircraft skin panel having an edge band defined thereon;
    forming a first panel region contiguous with a second panel region, wherein the first panel region has a first surface defining a outer mold line, and the second panel region is contiguous with and extends from the first panel region such that it has a gradually decreasing thickness;
    forming a splice plate region extending from the second panel region;
    forming a filler region and bonding it to the second panel region such that the filler region has an exposed surface substantially flush with the inner mold line; and
    fastening the splice plate region of the integrated aerodynamic panel to the edge band of the skin panel via a plurality of fasteners.

18. The method of claim 17, further including dispensing a sealant between the skin panel and the filler region.

19. The method of claim 17, wherein the fastening step includes fastening the splice plate region to the edge band using a plurality of removable bolts that are substantially flush with the splice plate region.

20. The method of claim 17, wherein the forming step includes forming the filler region from a syntactic material.

* * * * *